Aug. 21, 1934. A. MONTAN 1,970,616
RAKE
Filed Sept. 22, 1931
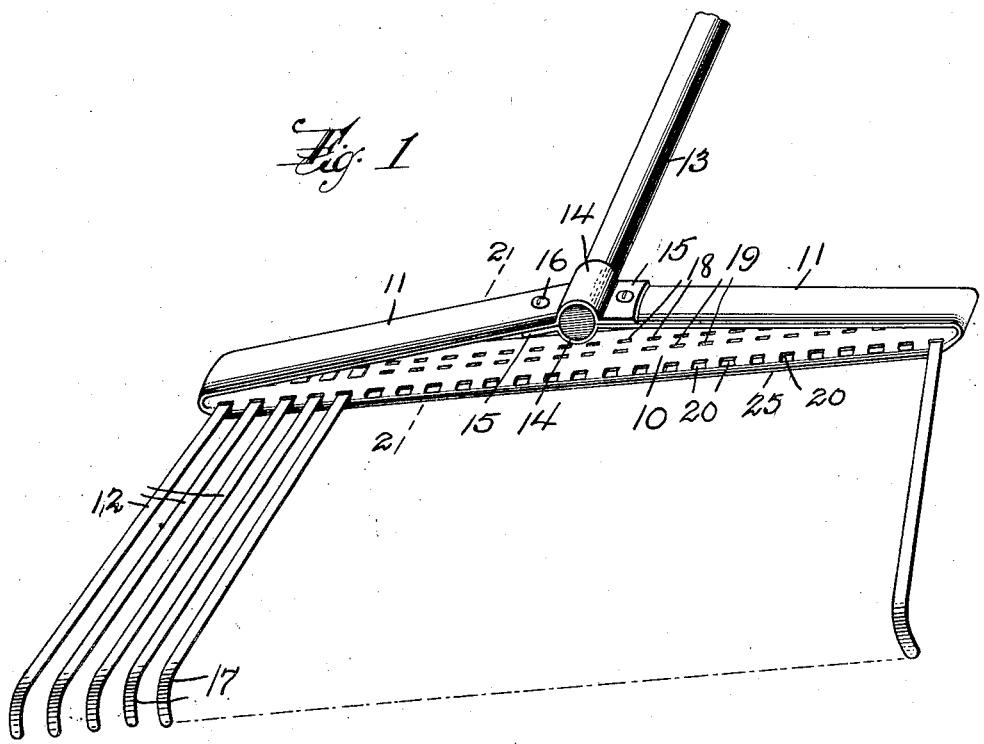
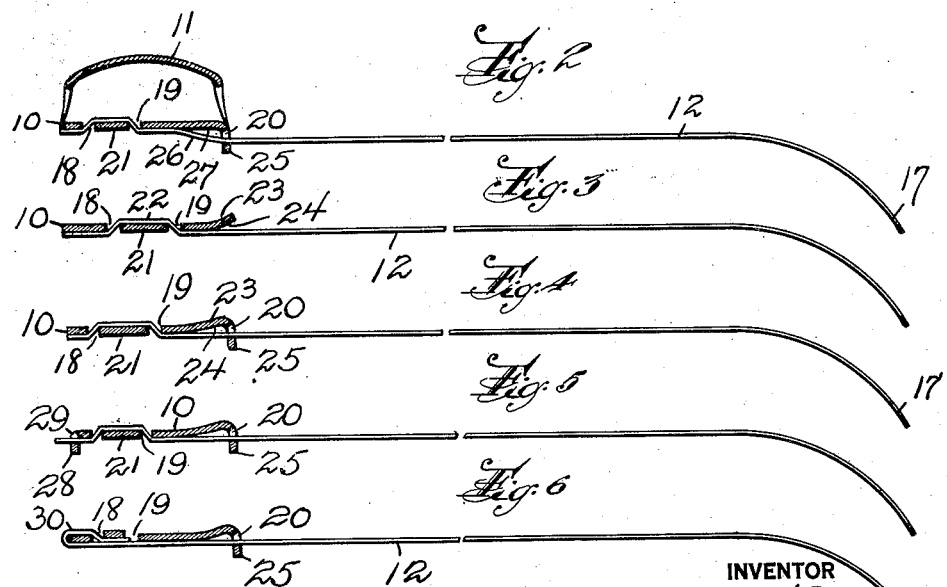
INVENTOR
Adolf Montan.
By: Wm H Caufield
ATTORNEY Patented Aug. 21, 1934

1,970,616

UNITED STATES PATENT OFFICE 1,970,616

RAKE

Adolf Montan, Montclair, N. J., assignor to Eastern Tool & Mfg. Co., Bloomfield, N. J.

Application September 22, 1931, Serial No. 564,272

7 Claims. (Cl. 55—114)

This invention relates to a rake of the type that is resilient at the ends of the tines whereby effective raking can be done without injury to grass or other plants over which the rake passes.

The object of the invention is to provide a rake that can be made at a low cost. Another object is to provide a rake that can be made with a substantially stiff frame of a single piece of metal. The improved rake, on account of few parts employed in its manufacture is extremely light in weight but at the same time it is of a size to cover a relatively large area at a single sweep.

Another advantage of the rake is due to the new construction of tine holding bar which provides a rolling or gradual contact between the tine and the bar whereby sharp bending of the tine at the same one point is avoided and breakage due to such frequent bending does not take place.

The invention also resides in the method of manufacture as the tines are inserted and secured and then the frame is bent over the tine holding bar to form a brace and a handle bracket.

The invention is illustrated in the accompanying drawing in which Figure 1 is a perspective view of a rake made according to my invention. Figure 2 is a section taken on line 2—2 in Figure 1. Figures 3, 4, 5 and 6 are sections through the tine-holding bar and illustrating a modified form of securing the tines to the bar.

The frame that holds the tines also receives the handle. It is made of a strip of sheet metal which forms the tine-holding bar 10. The ends 11 of the frame, before and when the tines 12 are secured, are arranged substantially perpendicular to the bar 10. After the tines are in place, as will be hereinafter described, the ends 11 are bent over to form a bracket to receive the handle 13. The preferred manner of forming the handle receiving part is to form two complementary depressed parts 14 which are opposite each other and form a socket for the end of the handle. The depressed parts or grooves 14 are near the ends of the arms 11 and the end 15 of each arm extends beyond along the other arm and are secured tightly together by the screw 16. To stiffen the bracket formed by these arms 11 the arms are channelled laterally as clearly shown in Figures 1 and 2. The frame therefore has some pliability but is relatively stiff when passed back and forth by means of the handle 13. The tines 12 are preferably of flat spring metal and relatively thin, having curved ends 17 where they engage the ground. The tines are secured to the bar 10 and either the bar or the tine is formed with an inclined or rounded part where they join. This is in order to afford a gradual bending of the tine in contrast to the usual sharp juncture where, in the old form of rake, the tines frequently break due to the localizing of the strain.

The preferred way of fastening the tines is to seat them in slits 18 and 19 in the rear part of the bar 10 and in some instances in slits 20 in the front part of the bar 10. The tines when placed in the slits 18 and 19 become corrugated at these points.

In the manufacture of the rake the part 21 between the slits 18 and 19 is depressed to allow the straight tine to pass directly through. When the tines are all in place the part 21 is pressed up in the plane of the bar 10 and this crimps or bends the tine to form the raised part 22 and the tine is held against movement. While this is done the arms 11 are spread to or beyond the ends of the bar 10. After the tines are pressed into place, usually by a small power press, the arms 11 are folded over, the handle 14 inserted between them and the screws 16 secured in place to clamp the ends of the arms and the handle together.

The rolling or divergent contact may be constructed in a number of ways as shown in Figures 2 to 6 inclusive. In Figure 3 the front end 23 of the bar 10 is bent upwardly and the downward pressure on the tine is taken up on the broad expanse of the face 24 thus subjecting the tine to no sharp edge.

In Figure 2 I show a flange 25 bent down on the front edge of the bar 10 and the slit 20 is deep enough to allow a bowed or bulged part 26 of the tine to be used. This form allows movement of the tine without sharp contact with the bar 10 but only with the lower face 27 of the bar.

In Figure 4 I show a flange 25 on the front edge of bar 10 but the bar proper is curved upwardly at the front edge. This form combines the features of Figures 2 and 3. Figure 5 shows a bar similar to that of Figure 4 except that it has an additional stiffening and holding flange 28 at the back edge of the bar 10 which flange is slitted, as at 29 to allow the reception of the rear end of the tine. In Figure 6, I show the bar 10 of Figure 4 but the tine is bent in a return bend 30 and passes twice through slit 18 to be pressed down in the form of a loop when the bar 10 is compressed.

Various changes can be made in the proportion and shape of the parts without departing from the scope of my invention.

I claim:—

1. A one-piece frame for rakes comprising a strip of metal forming a tine-holding bar and bent back at its ends to form bracket bars which overlap and form a space between them for a handle.

2. A one-piece frame for rakes comprising a strip of metal forming a tine-holding bar and bent back at its ends to form bracket bars which overlap and form a space between them for a handle, said bracket bars being curved in cross-section.

3. A rake comprising a bar slitted at intervals laterally to hold a tine, a tine secured in said slits, said bar being extended and folded back to receive a handle, means for holding said folded bars together, said latter bars covering the slitted bar.

4. A rake comprising a bar slitted at intervals laterally to hold a tine, a tine secured in said slits, said bar being extended and folded back to receive a handle, means for holding said folded bars together, said latter bars covering the slitted bar and being curved in cross-section to form a bracket to resist bending in the normal use of the rake.

5. A rake comprising a substantially flat bar, a flat tine, the bar having perforations spaced laterally on the flat part of the bar whereby the tine when passed through said perforations is corrugated, the bar having a front flange in which there is a perforation through which the tine also passes.

6. A rake comprising a substantially flat bar having a front flange with a slit therein the bar having slits near the back edge of the flat portion thereof, and a tine passing through the slit in the flange, then under the bar and then through the slits at the back of the bar to hold the tine in place.

7. A rake comprising a substantially flat bar having a front flange with a slit therein and having slits near the back edge thereof, and a tine passing through the slit in the flange, then under the bar and then folded over the back edge of the bar and again through the slit in the bar.

ADOLF MONTAN.